United States Patent [19]
Liu et al.

[11] Patent Number: 6,117,951
[45] Date of Patent: Sep. 12, 2000

[54] POLYIMIDE COMPOSITION FOR LOC ADHESIVE TAPES

[75] Inventors: Shur-Fen Liu; Jinn-Shing King; Jing-Pin Pan, all of Hsinchu, Taiwan

[73] Assignee: Industrial Technology Research Institute, Hsinchu, Taiwan

[21] Appl. No.: 09/253,836

[22] Filed: Feb. 19, 1999

[51] Int. Cl.$^7$ ........................................... C08L 79/08
[52] U.S. Cl. ........................... 525/426; 524/538; 525/436
[58] Field of Search ...................................... 525/426, 436

[56] References Cited

U.S. PATENT DOCUMENTS

| | | | |
|---|---|---|---|
| 4,097,545 | 6/1978 | Akiyama et al. | 260/830 |
| 5,200,474 | 4/1993 | Chen et al. | 525/426 |
| 5,268,432 | 12/1993 | Pan et al. | 525/422 |
| 5,372,891 | 12/1994 | Yu et al. | 428/458 |
| 5,518,779 | 5/1996 | Yu et al. | 427/508 |

*Primary Examiner*—Ana Woodward
*Attorney, Agent, or Firm*—W. Wayne Liauh

[57] ABSTRACT

An adhesive tape for lead-on-chip (LOC) IC applications containing a polyamide-based adhesive composition which is the reaction product from a reaction mixture of: (a) a pre-imidized polyamic acid; and (b) a bismaleimide that has been modified by a barbituric acid of a derivative of barbituric acid to become a barbituric acid modified bismaleimide. The pre-imidized polyamic acid is a reaction product from a reaction mixture that contains a polyamic acid and a cyclizing agent. The polyamide-based adhesive composition provides all the desirable heat resistance and other mechanical and dielectric characteristics. But, most significantly, its microscopic rheological properties are adjusted such that excellent contact is achieved between the resin molecules and the lead frame surface while eliminating or at least minimizing the extent of adhesive overflow, which can substantially reduce the reliability of the final IC product.

8 Claims, 1 Drawing Sheet

POLYIMIDE COMPOSITION FOR LOC ADHESIVE TAPES

FIELD OF THE INVENTION

The present invention relates to an improved adhesive composition with special microscopic rheological characteristics so that it can be advantageously used in semiconductor industry for making integrated circuit (IC) packages. More specifically, the present invention relates to an improved polyimide adhesive composition which provides enhanced adhesion with reduced adhesive over flow while exhibiting excellent thermal and dielectric characteristics, so that it can be advantageously utilized in reduced-sized lead-on-chip (LOC) IC packaging application.

BACKGROUND OF THE INVENTION

The trend in the integrated circuit (IC) industry is to develop circuit boards with reduced weight, reduced thickness, and reduced dimension. However, because of the demand in increased performance, the trend in IC chips is to increase its size. The need to package IC chips with ever-increasing dimensions in a circuit board with ever-decreasing dimensions, while maintaining excellent reliability and dielectric properties, presents a great challenge to the IC packaging industry.

Utilization of the lead-on-chip (LOC) packaging technology can reduce the area of a plastic-based circuit board. Typically, the LOC technology allows the chip surface to achieve 85% of the total board surface, an improvement of about 30% over conventional technologies. Thermosetting epoxy resins are commonly used as the adhesive tape in LOC applications. However, because of their relatively high ionic contents and high volatile material, the reliability of epoxy based LOC packages, especially with regard to dielectric properties, often is not very reliable. This problem can become even more profound when the IC products are moving toward high production rate and high clock speed.

Polyimide (PI), which is a polymeric material with high heat resistance and good dielectric properties, has been widely used in electronic applications, such as in making flexible printed circuit (PFC), tape automated bondings (TAB), etc. More recently, PI is also gradually used in IC packaging applications as an adhesive. Prior art polyimides typically are either non-thermoplastic resins which do not exhibit flow behavior at elevated temperature (i.e., above Tg), or are thermoplastic resins but with a very high Tg which would degrade before it exhibits any flow behavior. Furthermore, in order to improve the adhesion of polyimide resins, various epoxy resins are often added to form a polyimide/epoxy resin mixture. However, this can adversely affect the heat resistance of the resultant mixture.

Both non-flowable thermoplastic and thermosetting polyimides are not suitable for use as the adhesive tape in LOC applications. In order for polyimides to be used as adhesive tapes in LOC applications, they must be thermoplastic in nature and exhibits a definitive micro-flow behavior, so as to facilitate the adhesion between the lead frame and the IC device. However, the amount of adhesive flow of the polyimides cannot be too great. An excessive extent of the adhesive overflow due to high flowability will affect the later stage packaging process and, more importantly, it will cause a stress to be generated which can affect the reliability of the final packaged product. In other words, a desirable polyimide, in addition to its being thermoplastic in nature, must have enough molecular movements at temperatures above Tg, so as to achieve good contacts with the lead frame. However, too much of such resin mobility can result in adhesive overflow, this is undesirable. At the present time, no polyimides can simultaneously satisfy both of these requirements.

U.S. Pat. No. 5,200,474, the content thereof is incorporated herein by reference, discloses a polyimide adhesive composition which is a reaction product of polyamic acid and bismaleimide modified by barbituric acid or a derivative thereof. The polyimide adhesive exhibits excellent adhesion with copper film, but it has a very high Tg, and does not provide enough fluidity for LOC adhesive tape applications.

U.S. Pat. No. 5,268,432, the content thereof is also incorporated herein by reference, discloses a heat resistant adhesive composition comprising an admixture of a modified bismaleimide (BMI) resin, a modified polyamide-imide and a solvent. The bismaleimide is modified by barbituric acid and/or a derivative thereof and the polyamide-imide is modified by an epoxy resin. The overall solid content of the heat resistant adhesive composition is in the range of about 15 to 50 percent by weight, wherein solid contents per overall solid content of the modified bismaleimide resin and the modified polyamide-imide are 60 to 90 percent and 10 to 40 percent, respectively. Similar to polyimide adhesive composition of the '474 patent, the polyimide based adhesive exhibits excellent adhesion with copper film (and with improved heat resistance), but it also has a very high Tg, and does not provide enough fluidity for LOC adhesive tape applications.

SUMMARY OF THE INVENTION

The primary object of the present invention is to develop a polyimide resin which can be advantageously used as an adhesive tape in LOC packaging application. More specifically, the primary object of the present invention is to develop a thermoplastic polyimide which exhibits a definitive extent of micro-flow behavior at elevated (i.e., packaging) temperature, such that it allows the resin molecules to have excellent contact with the lead frame, but with little or no adhesive overflow. The good contact of the resin molecules with lead frame results in good adhesive; whereas, the absence of adhesive overflow eliminates the presence of material stress, thus ensuring the reliability of the final packaged IC products. Both of these advantageous characteristics of the polyimides of the present invention make them excellent adhesive tape materials for LOC applications.

The LOC adhesive tape disclosed in the present invention comprises a modified bismaleimide (BMI) and a pre-imidized polyamic acid, which are mixed to form a varnish with excellent compatibility. The varnish is coated on the intended surfaces, and then cured at a post-cure temperature of about 250° C. The resultant adhesive tape exhibits excellent adhesion with a well-controlled adhesion overflow, and exceeds level 1 reliability test criteria.

In summary, the process disclosed in the present invention for preparing an improved LOC adhesive tape comprises the following steps:

(1) Mixing a barbituric acid (BTA), or its derivatives, with a modified bismaleimide (BMI) at a molar ratio between 1/3 and 1/10 in an appropriate solvent; the mixture is allowed to react at 100–130° C. for 0.5 to 6 hours.

(2) Adding a pre-imidized polyamic acid and an organic solvent to the BTA/BMI mixture such that (i) the total solid content is about 13–20 wt %, and (2) the amount of BMI is about 2 to 15% wt % of the total solid content.

(3) Applying the mixture from step (2) on a polyimide film; and (4) Curing the polyimide film to form a low adhesive overflow LOC adhesive tape.

The polyamic acid can be prepared by reacting the following mixture which contains a dianhydride and a diamine. Both of these components are discussed further below:

(1) A dianhydride, which is represented by the following formula:

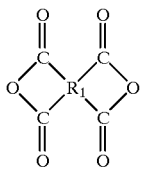

wherein $R_1$ can be can be an aromatic group, an aliphatic group, a cycloaliphatic group, or an aliphatic group containing siloxane. Examples of anhydrides suitable for the present invention include: pyromellitic dianhydride, 2,3,6,7-naphthalene tetracarboxylic dianhydride, 3,3',4,4'-diphenyl tetracarboxylic dianhydride, 1,4,5,8-naphthalene tetrcarboxylic dianhydride, 1,2,5,6-naphthalene tetracarboxylic dianhydride, bis (3,4-dicarboxyphenyl) sulfone dianhydride, perylene 3,4,9,10-tetracarboxylic dianhydride, bis (3,4-dicarboxyphenyl) ether dianhydride, ethylene tetracarboxylic acid dianhydride, cyclopentadienyl tetracarboxylic acid dianhydride, 3,4,3',4'-benzophenone tetracarboxylic acid dianhydride, bis (3,4'-dicarboxyphenyl) 2,5-oxadiazole-1,3,4 dianhydride, bis (3',4'-dicarboxyphenyl oxadiazole-1,3,4) paraphenylene dianhydride, (3',4'-dicarboxyphenyl) 2-dicarboxy 5,6-benzimidazole dianhydride, (3',4'-dicarboxyphenyl) 2-dicarboxy 5,6-benzoxazole dianhydride, (3',4'-dicarboxyphenyl) 2-dicarboxy 5,6-benzothiazole dianhydride, or bis (3',4'-dicarboxydiphenylether) 2,5-oxadiazole 1,3,4 dianhydride.

(2) A diamine, which represented by the following formula:

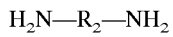

where $R_2$ can be an aromatic group, an aliphatic group, a cycloaliphatic group, or an aliphatic group containing siloxane. Examples of the diamines suitable for the present invention include: ethylene diamine, propylene diamine, tetramethylene diamine, pentamethylene diamine, hexamethylene diamine, 2-ethylhexylene diamine, nonamethylene diamine, decamethylene diamine, 2,11-diamino-dodecane and the like; meta-phenylene diamine, para-phenylene diamine, 2,2'-naphthalene diamine, 4,4'-biphenylene idamine, methylene dianiline-(4,4'-diaminodiphenyl methane), ethylene dianiline-(4,4'-diaminodiphenyl ethane), propylene dianiline-(4,4'-diaminodiphenyl propane) and the like, bis-(para-amino-cyclohexyl)N-phenyl amine, bis-(para-amino-cyclohexyl)N-methyl amine, hexafluoroisopropylidene-bis-(4-phenyl amine), 4,4'-diamino-diphenyl methane, 4,4'-diamino-diphenyl ethane, 4,4'-diamino-diphenyl propane, 4,4'-diamino-diphenyl butane, 2,6-diamino-pyridine, bis-(4-amino-phynyl) diethyl silane, bis-(4-amino-phynyl) diphenyl silane, bis-(4-amino-phynyl) ethyl phosphine oxide, bis-(4-amino-phynyl) phenyl phosphine oxide, bis-(4-amino-phynyl)-N-phenylamine, bis-(4-amino-phynyl)-N-methylamine, 3,3'-dimethyl-4,4'-diamino-biphenyl, 3,3'-dimethoxy-benzidine, 2,4-bis(o-amino-t-butyl)toluene, bis(para-o-amino-t-butyl-phenyl) ether, para-bis-(2-methyl-4-amino-phenyl)benzene, para-bis-(1,1-dimethyl-5-amino-pentyl)benzene, m-xylylene diamine, p-xylylene diamine, oxydianiline-(4,4'-diaminodiphenylether), ketodianiline, 4,4'-diamino-diphenyl sulfide, 3,3'-diamino-diphenyl sulfide, 4,4'-diamino-diphenyl sulfone, 3,3'-diamino-diphenyl sulfone, bis-(para-amino-cyclohexyl)methane, bis-(para-amino-cyclohexyl)ethane, bis-(para-amino-cyclohexyl)propane, bis-(para-amino-cyclohexyl)sulfide, bis-(para-amino-cyclohexyl)sulfone, bis-(para-amino-cyclohexyl)ether, bis-(para-amino-cyclohexyl)diethyl silane, bis-(para-amino-cyclohexyl)diphenyl silane, bis-(para-amino-cyclohexyl) ethyl phosphine oxide, bis-(para-amino-cyclohexyl)phenyl phosphine oxide, 1,2-bis-(3-amino-propoxy)ethane, 2,2-dimethyl propylene diamine, 3-methoxy-hexamethylene diamine, 2,5-dimethylheptamet hylene diamine, 5-methylnonamethylene diamine, 1,4 diamino-cyclohexane, 1,2-diamino-octadecane, 2,5-diamino-1,3,4-oxadiazole.

The pre-imidized polyamic acid is prepared by reacting the polyamic acid with a cyclizing agent such as tertiary amine or a mixture of tertiary amine and acetic anhydride. The amount of cyclizing agent is between 0.1 and 4 times of polyamic acid based on equivalent. Examples of cyclizing agent include: dimethylaniline, quinoline, pyridine, isoquinoline, 2-methylpyridine, α-methylquinoline, 1,3,5-trimethylpyridine, triethylamine, tributylamine, and trihexylamine.

The bismaleimide is represented by either of the following formulas:

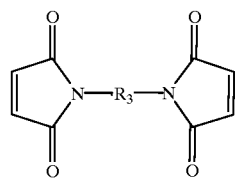

or

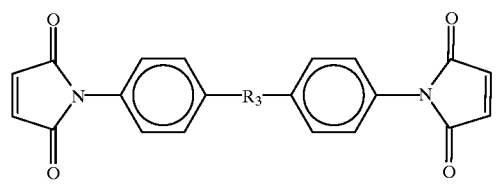

where $R_3$ can be an aromatic group, an aliphatic group, a cycloaliphatic group, or an aliphatic group containing siloxane. Examples of bismaleimides include: N,N'-ethylene-bis-maleimide, N,N'-butylene-bis-maleimide, N,N'-phenylene-bis-maleimide, N,N'-hexamethylene-bis-maleimide, N,N'-4,4'-diphenyl methane-bis-maleimide, N,N'-4,4'-diphenyl ether-bis-maleimide, N,N'-4,4'-diphenyl sulfone-bis-maleimide, N,N'-4,4'-dicyclohexyl methane-bis-maleimide, N,N'-xylylene-bis-maleimide, N,N'-diphenyl cyclohexane-bis-maleimide and the like.

The barbituric acid or its derivative which is used to modify the bismaleimide is represented by the following general formula:

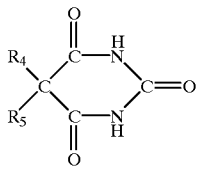

where $R_4$ and $R_5$, which can be different or the same, are —H, —$CH_3$, —$C_2H_2$, —$C_6H_5$, —$CH(CH_3)_2$, —$CH_2CH(CH_3)_2$, —$CH_2CH_2CH(CH_3)_2$, or

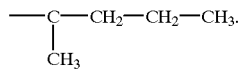

The polyimide based adhesive tape prepared in the present invention exhibits excellent adhesion strength, elongation, and other mechanical properties such as tensile strength and tensile module. But more importantly, when the adhesive tape of the present invention is applied at the LOC processing temperature of about 250° C., essentially no adhesive overflow is observed. This greatly improves the reliability of the IC packages utilizing the adhesive tape of the present invention.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
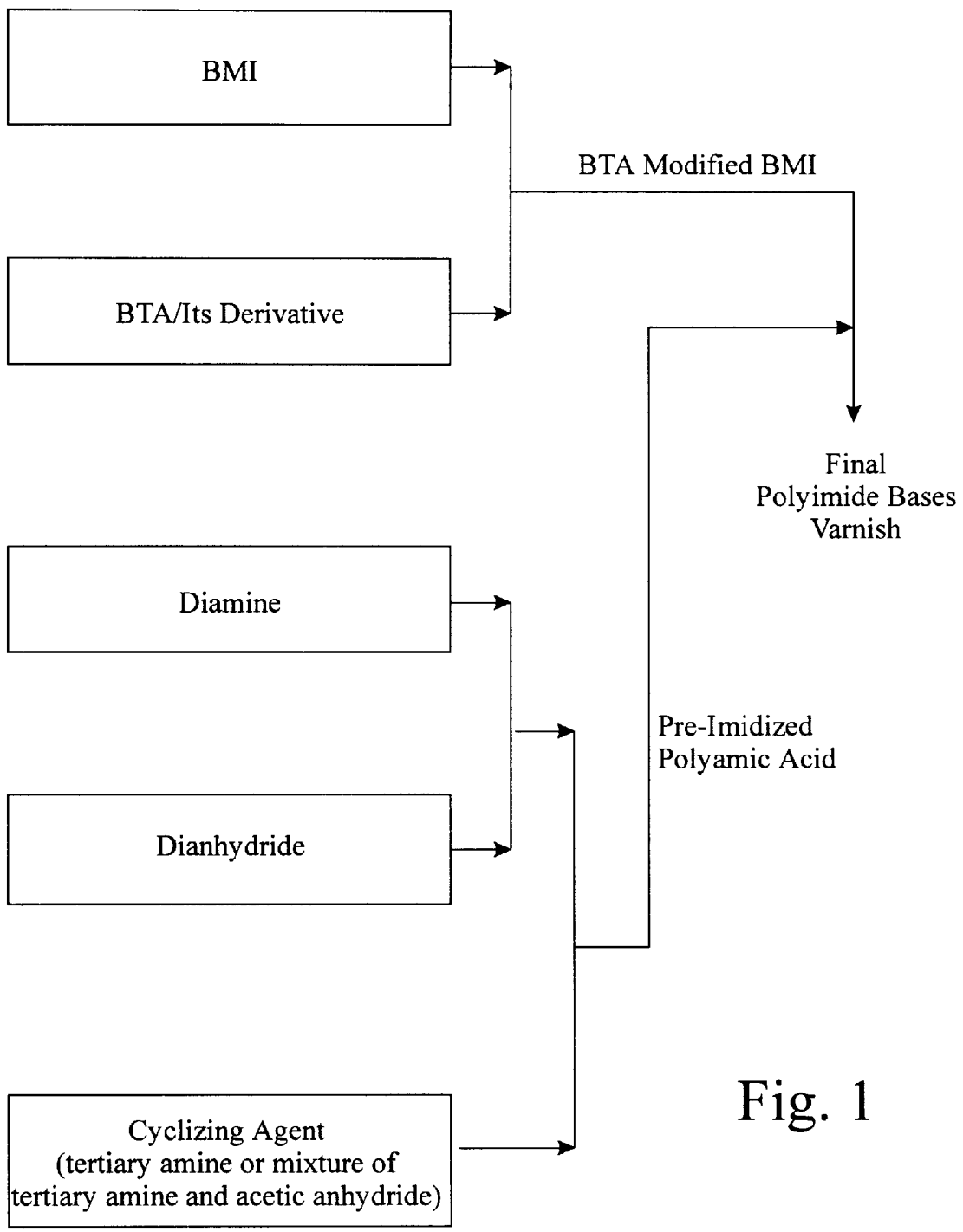
FIG. 1 is a schematic flowchart summarizing the process for preparing the improved polyimide based adhesive composition of the present invention.

The present invention discloses an improved polyimide resin which can be advantageously used as an adhesive tape in LOC packaging applications without exhibiting adhesive overflow so as to ensure the quality and reliability of the final products. The polyimide-based adhesive of the present invention exhibits a suitable thermoplastic characteristic such that its microscopic rheology at elevated (i.e., packaging) temperature allows the resin molecules to have excellent contact with the lead frame surface, but such microscopic rheology is controlled so that little or no adhesive overflow is exhibited. The good contact with lead frame results in good adhesive; whereas, the absence of adhesive overflow eliminates the presence of material stress, thus ensuring the reliability of the final packaged IC products. Both of these advantageous characteristics of the polyimides of the present invention make them excellent adhesive tape materials for LOC applications.

The LOC adhesive tape disclosed in the present invention is a reaction product from a mixture which comprises a polyimide, which is prepared form a reaction mixture that contains a polyamic acid, and a modified bismaleimide (BMI) in the presence of a cycling agent. The reaction product is formed into a varnish with excellent compatibility which is then coated on the intended surface, and cured at a post-cure temperature of about 250° C. The resultant adhesive tape exhibits excellent adhesion with a well-controlled adhesion overflow, and exceeds level 1 reliability test criteria.

FIG. 1 is a schematic flowchart summarizing the process for preparing the improved polyimide based adhesive composition of the present invention. First, a bismaleimide (BMI) is modified by a barbituric acid or a derivative of barbituric acid by mixing a barbituric acid (BTA), or its derivatives, with a bismaleimide at a molar ratio between 1/3 and 1/10 in an appropriate solvent; the mixture is allowed to react at 100–130° C. for 0.5 to 6 hours.

The bismaleimide is represented by either of the following formulas:

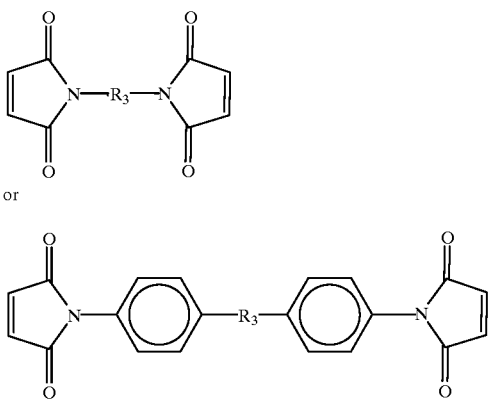

where $R_3$ can be an aromatic group, an aliphatic group, a cycloaliphatic group, or an aliphatic group containing siloxane. Examples of bismaleimides include: N,N'-ethylene-bis-maleimide, N,N'-butylene-bis-maleimide, N,N'-phenylene-bis-maleimide, N,N'-hexamethylene-bis-maleimide, N,N'-4,4'-diphenyl methane-bis-maleimide, N,N'-4,4'-diphenyl ether-bis-maleimide, N,N'-4,4'-diphenyl sulfone-bis-maleimide, N,N'-4,4'-dicyclohexyl methane-bis-maleimide, N,N'-xylylene-bis-maleimide, N,N'-diphenyl cyclohexane-bis-maleimide and the like.

The barbituric acid or its derivative which is used to modify the bismaleimide is represented by the following general formula:

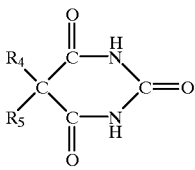

where $R_4$ and $R_5$, which can be different or the same, are are —H, —$CH_3$, —$C_2H_2$, —$C_6H_5$, —$CH(CH_3)_2$, —$CH_2CH(CH_3)_2$, —$CH_2CH_2CH(CH_3)_2$, or

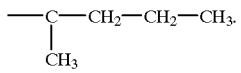

The barbituric acid modified bismaleimide is mixed with a pre-imidized polyamic acid, which contains a polyamic acid and an appropriate amount of a cyclizing agent, in an appropriate organic solvent, to form a varnish. The varnish is prepared such that (i) the total solid content is about 13–20 wt %, and (2) the amount of the barbituric acid modified bismaleimide is about 2 to 15% wt % of the total solid content. The varnish so prepared is applied on a polyimide film. After curing an LOC adhesive tape low adhesive overflow with low adhesive overflow is obtained.

The polyamic acid described is prepared by reacting a mixture which contains a dianhydride and a diamine. Both of these components are discussed further below:

The dianhydride is represented by the following formula:

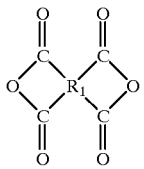

wherein $R_1$ can be can be an aromatic group, an aliphatic group, a cycloaliphatic group, or an aliphatic group containing siloxane. Examples of anhydrides suitable for the present invention include: pyromellitic dianhydride, 2,3,6,7-naphthalene tetracarboxylic dianhydride, 3,3',4,4'-diphenyl tetracarboxylic dianhydride, 1,4,5,8-naphthalene tetrcarboxylic dianhydride, 1,2,5,6-naphthalene tetracarboxylic dianhydride, bis (3,4-dicarboxyphenyl) sulfone dianhydride, perylene 3,4,9,10-tetracarboxylic dianhydride, bis (3,4-dicarboxyphenyl) ether dianhydride, ethylene tetracarboxylic acid dianhydride, cyclopentadienyl tetracarboxylic acid dianhydride, 3,4,3',4'-benzophenone tetracarboxylic acid dianhydride, bis (3,4'-dicarboxyphenyl) 2,5-oxadiazole-1,3,4 dianhydride, bis (3',4'-dicarboxyphenyl oxadiazole-1,3,4) paraphenylene dianhydride, (3',4'-dicarboxyphenyl) 2-dicarboxy 5,6-benzimidazole dianhydride, (3',4'-dicarboxyphenyl) 2-dicarboxy 5,6-benzoxazole dianhydride, (3',4'-dicarboxyphenyl) 2-dicarboxy 5,6-benzothiazole dianhydride, or bis (3',4'-dicarboxydiphenylether) 2,5-oxadiazole 1,3,4 dianhydride.

The diamine is represented by the following formula:

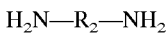

where $R_2$ can be an aromatic group, an aliphatic group, a cycloaliphatic group, or an aliphatic group containing siloxane. Examples of diamines suitable for the present invention include: ethylene diamine, propylene diamine, tetramethylene diamine, pentamethylene diamine, hexamethylene diamine, 2-ethylhexylene diamine, nonamethylene diamine, decamethylene diamine, 2,11-diamino-dodecane and the like; meta-phenylene diamine, para-phenylene diamine, 2,2'-naphthalene diamine, 4,4'-biphenylene idamine, methylene dianiline-(4,4'-diaminodiphenyl methane), ethylene dianiline-(4,4'-diaminodiphenyl ethane), propylene dianiline-(4,4'-diaminodiphenyl propane) and the like, bis-(para-amino-cyclohexyl)N-phenyl amine, bis-(para-amino-cyclohexyl)N-methyl amine, hexafluoroisopropylidene-bis-(4-phenyl amine), 4,4'-diamino-diphenyl methane, 4,4'-diamino-diphenyl ethane, 4,4'-diamino-diphenyl propane, 4,4'-diamino-diphenyl butane, 2,6-diamino-pyridine, bis-(4-amino-phynyl) diethyl silane, bis-(4-amino-phynyl) diphenyl silane, bis-(4-amino-phynyl) ethyl phosphine oxide, bis-(4-amino-phynyl) phenyl phosphine oxide, bis-(4-amino-phynyl)-N-phenylamine, bis-(4-amino-phynyl)-N-methylamine, 3,3'-dimethyl-4,4'-diamino-biphenyl, 3,3'-dimethoxy-benzidine, 2,4-bis(o-amino-t-butyl)toluene, bis (para-o-amino-t-butyl-phenyl)ether, para-bis-(2-methyl-4-amino-phenyl)benzene, para-bis-(1,1-dimethyl-5-amino-pentyl)benzene, m-xylylene diamine, p-xylylene diamine, oxydianiline-(4,4'-diaminodiphenylether), ketodianiline, 4 4'-diamino-diphenyl sulfide, 3,3'-diamino-diphenyl sulfide, 4,4'-diamino-diphenyl sulfone, 3,3'-diamino-diphenyl sulfone, bis-(para-amino-cyclohexyl)methane, bis-(para-amino-cyclohexyl)ethane, bis-(para-amino-cyclohexyl) propane, bis-(para-amino-cyclohexyl)sulfide, bis-(para-amino-cyclohexyl)sulfone, bis-(para-amino-cyclohexyl) ether, bis-(para-amino-cyclohexyl)diethyl silane, bis-(para-amino-cyclohexyl)diphenyl silane, bis-(para-amino-cyclohexyl)ethyl phosphine oxide, bis-(para-amino-cyclohexyl)phenyl phosphine oxide, 1,2-bis-(3-aminopropoxy)ethane, 2,2-dimethyl propylene diamine, 3-methoxy-hexamethylene diamine, 2,5-dimethylheptamethylene diamine, 5-methylnonamethylene diamine, 1,4 diamino-cyclohexane, 1,2-diamino-octadecane, 2,5-diamino-1,3,4-oxadiazole.

The pre-imidized polyamic acid is prepared by reacting the polyamic acid with a cyclizing agent such as tertiary amine or a mixture of tertiary amine and acetic anhydride. The amount of cyclizing agent is preferably between 0.1 and 4 times of polyamic acid based on equivalent. Examples of the cyclizing agent include: dimethylaniline, quinoline, pyridine, isoquinoline, 2-methylpyridine, α-methylquinoline, 1,3,5-trimethylpyridine, triethylamine, tributylamine, and trihexylamine.

The polyimide based adhesive tape prepared in the present invention exhibits excellent adhesion strength, elongation, and other mechanical properties such as tensile strength and tensile module. But more importantly, when the adhesive tape of the present invention is applied at the LOC processing temperature of about 250° C., essentially no adhesive overflow is observed. This greatly improves the reliability of the IC packages utilizing the adhesive tape of the present invention.

The present invention will now be described more specifically with reference to the following examples. It is to be noted that the following descriptions of examples, including the preferred embodiment of this invention, are presented herein for purposes of illustration and description, and are not intended to be exhaustive or to limit the invention to the precise form disclosed.

Example 1

800.5 g (1.95 Mole) of BAPP (2,2-bis(4-(4-aminophenoxyl)phenyl)propane) was added into a 10-liter glass reactor which was dissolved by adding 5228 g of DMAc and 1148 g of xylene. Thereafter, 598.84 g (1.9305 mole) of ODPA (4,4'oxydiphthalic anhydride) was added, in 2 to 4 increments, each increment being separated by about 20 to 40 minutes, into the BAPP solution. The mixture was mixed to react under $N_2$ and at room temperature, for about 5 hours to form a polyamic acid solution having a solid content of about 18 wt %.

The polyamic acid solution was added with 137.048 g of triethylamine and 138.267 g of acetic anhydride, and stirred at room temperature for about 8 hours. The solution was diluted with 500 g of the same solvent mixture to reduce its solid content to 16.4%. The formed a pre-imidized polyamic acid solution.

To form the polyimide based varnish of the present invention, the pre-imidized polyamic acid was mixed with a barbituric modified bismaleimide. The barbituric modified bismaleimide was prepared by first dissolving 143.34 g of N,N'-4,4'-diphenylmethane-bis-maleimide in 207.5.5 g of γ-butyrolactone and 51.876 g of methyl ethyl ketone (MEK). Then 2.562 g of barbituric acid was added to the bismaleimide solution and stirred at 120° C. for 6 hours to form the barbituric modified bismaleimide.

The barbituric modified bismaleimide so prepared was added with 390 g of the pre-imidized polyamic acid prepared above, and stirred for 6 hours. Finally an appropriate organic solvent was added to reduce the total solid content of the final varnish to 16 wt %.

The varnish of Example 1 was applied on both sides of a polyimide film (Kapton), as well as on one side of a Mylar substrate. After curing at 250° C., a three layer LOC adhesive tape and a single layer polyimide film were obtained. The physical properties of the single polyimide film were summarized in Table 1. The adhesion strength between the three layer LOC adhesion tape and a copper lead frame was measured to be 1.14 lb/cm, and no adhesive overflow was observed. This result was also summarized in Table 1.

COMPARATIVE EXAMPLE 1

The polyimide based varnish in Comparative Example 1 was prepared in an identical procedure as in Example 1, except that no barbituric modified bismaleimide nor cyclizing agent were added to the polyamic acid. The comparative varnish was similarly tested and the results were summarized in Table 1. The adhesion strength between the three layer LOC adhesion tape and a copper lead frame was measured to be 1.15 lb/cm, but noticeable adhesive overflow was observed. This result was also summarized in Table 1.

TABLE 1

|  | Example 1 | Comp. Example 1 |
| --- | --- | --- |
| Tg (° C.) | 232.9 | 229.2 |
| Td (° C.) | 502 | 512 |
| CTE (ppm/° C.) | 56.0 | 58.2 |
| Tensile strength (Kgf/mm$^2$) | 16.0 | 15.2 |
| Tensile modulus (Kgf/mm$^2$) | 288.8 | 275.5 |
| Elongation (%) | 8.5 | 6.5 |
| Adhesive Overflow in a three layer LOC adhesion tape with copper lead frame | No | Significant |

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A thermoplastic polyimide-based adhesive composition comprising the reaction product from a reaction mixture that contains:
   (a) a pre-imidized polyamic acid; and
   (b) a bismaleimide that has been modified by a barbituric acid or a derivative of barbituric acid to become a barbituric acid modified bismaleimide;
   (c) wherein said pre-imidized polyamic acid is a reaction product from a reaction mixture that contains a polyamic acid and a cyclizing agent at room temperature.

2. The thermoplastic polyimide-based adhesive composition according to claim 1 wherein said cyclizing agent is a tertiary amine or a mixture of tertiary amine and acetic anhydride.

3. The thermoplastic polyimide-based adhesive composition according to claim 2 wherein said tertiary amine is selected from the group consisting of dimethylaniline, quinoline, pyridine, isoquinoline, 2-methylpyridine, α-methylquinoline, 1,3,5-trimethylpyridine, triethylamine, tributylamine, and trihexylamine.

4. The thermoplastic polyimide-based adhesive composition according to claim 1 which also contains an organic solvent and:
   (a) the total solid content is about 13–20 wt %; and
   (b) the amount of said barbituric acid modified bismaleimide is about 2 to 15% wt % of the total solid content.

5. The thermoplastic polyimide-based adhesive composition according to claim 1 wherein said polyamic acid is prepared from a reaction mixture that contains:
   (a) a dianhydride, which is represented by the following formula:

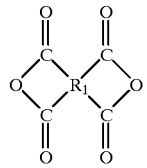

(b) a diamine, which is represented by the following formula:

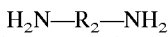

$H_2N-R_2-NH_2$ where $R_1$ and $R_2$, which can be different or the same, are aromatic groups, aliphatic groups, cycloaliphatic groups, or aliphatic groups containing siloxane.

6. The thermoplastic polyimide-based adhesive composition according to claim 1 wherein said bismaleimide is represented by either of the following two formulas:

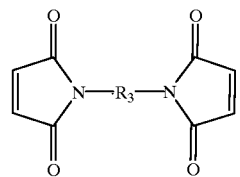

or

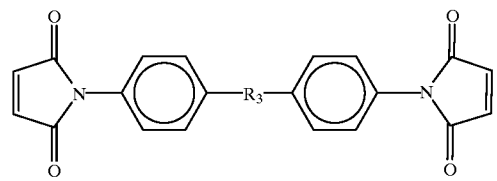

where $R_3$ is an aromatic group, an aliphatic group, a cycloaliphatic group, or an aliphatic group containing siloxane.

7. The thermoplastic polyimide-based adhesive composition according to claim 1 wherein said barbituric acid or its derivative which is used to modify said bismaleimide is represented by the following formula:

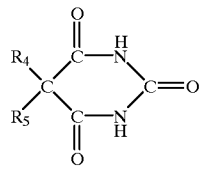

where $R_4$ and $R_5$, which can be different or the same, are —H, —CH$_3$, —C$_2$H$_5$,, —C$_6$H$_5$, —CH(CH$_3$)$_2$, —CH$_2$CH $(CH_3)_2$, $-CH_2CH_2CH(CH_3)_2$, or
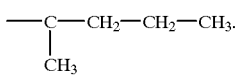
8. The thermoplastic polyimide-based adhesive composition according to claim 1 wherein the amount of said cyclizing agent used to prepare said pre-imidized polyamic is about 0.1 and 4 times of said polyamic acid based on equivalence.
* * * * *